US009243533B2

(12) United States Patent
Yamashita et al.

(10) Patent No.: US 9,243,533 B2
(45) Date of Patent: Jan. 26, 2016

(54) ENGINE SYSTEM

(75) Inventors: Akira Yamashita, Shizuoka-ken (JP); Koichiro Nakatani, Mishima (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/405,547

(22) PCT Filed: Jun. 7, 2012

(86) PCT No.: PCT/JP2012/064719
§ 371 (c)(1),
(2), (4) Date: Dec. 4, 2014

(87) PCT Pub. No.: WO2013/183153
PCT Pub. Date: Dec. 12, 2013

(65) Prior Publication Data
US 2015/0184567 A1 Jul. 2, 2015

(51) Int. Cl.
*F01N 3/00* (2006.01)
*F01N 3/08* (2006.01)
*B01D 53/94* (2006.01)
(Continued)

(52) U.S. Cl.
CPC .............. *F01N 3/0814* (2013.01); *B01D 53/94* (2013.01); *B01D 53/9409* (2013.01); *F01N 3/208* (2013.01); *F01N 3/2013* (2013.01); *F01N 3/2033* (2013.01); *F01N 3/22* (2013.01); *F01N 3/34* (2013.01); *F01N 9/00* (2013.01); *B01D 53/9477* (2013.01); *B01D 53/9495* (2013.01); *B01D 2251/2067* (2013.01); *B01D 2255/20738* (2013.01); *B01D 2255/50* (2013.01); *F01N 2610/02* (2013.01); *F01N 2900/1602* (2013.01); *F01N 2900/1622* (2013.01);

(Continued)

(58) Field of Classification Search
CPC ....... F01N 3/2033; F01N 3/0814; F01N 9/00; F01N 3/34; F01N 3/208; F01N 3/2013; B01D 53/9409; B01D 53/94
USPC .......................................................... 60/286
See application file for complete search history.

(56) References Cited

U.S. PATENT DOCUMENTS 5,617,726 A * 4/1997 Sheridan et al. ............. 60/605.2
8,949,004 B2 * 2/2015 Ishigami et al. ............. 701/108
(Continued)

FOREIGN PATENT DOCUMENTS

DE 10 2010 013696 A1 10/2011
JP 2005-344597 A 12/2005
(Continued)

*Primary Examiner* — Jason Shanske
(74) *Attorney, Agent, or Firm* — Finnegan, Henderson, Farabow, Garrett & Dunner, LLP

(57) ABSTRACT

An engine system includes: an exhaust path through which an exhaust gas of an engine passes; an urea injection valve that injects urea into the exhaust path; a catalyst that is provided in the exhaust path on a downstream of the urea injection valve, and that selectively reduces NOx by using ammonia acting as a reducing agent, the ammonia being generated by hydrolyzing injected urea from the urea injection valve; a heating portion that is capable of heating the catalyst and the injected urea; and a control unit that performs first control, in which the urea injection valve injects urea, the heating portion heats the injected urea to generate ammonia, or second control, in which the heating portion increases a temperature of the catalyst to a temperature at which NOx can be reduced, on a basis of an amount of ammonia adsorbed on the catalyst.

7 Claims, 10 Drawing Sheets

(51) Int. Cl.
*F01N 3/20* (2006.01)
*F01N 9/00* (2006.01)
*F01N 3/22* (2006.01)
*F01N 3/34* (2006.01)
*F02D 41/02* (2006.01)
*F02D 41/40* (2006.01)

(52) U.S. Cl.
CPC ............ *F02D 41/024* (2013.01); *F02D 41/405* (2013.01); *Y02T 10/24* (2013.01); *Y02T 10/26* (2013.01)

(56) References Cited

U.S. PATENT DOCUMENTS

| | | | |
|---|---|---|---|
| 2006/0153761 A1* | 7/2006 | Bandl-Konrad et al. | 423/239.1 |
| 2008/0167786 A1* | 7/2008 | Sasaki et al. | 701/102 |
| 2008/0271440 A1 | 11/2008 | Xu et al. | |
| 2010/0077735 A1 | 4/2010 | Tanaka | |
| 2010/0290957 A1* | 11/2010 | Yoshida et al. | 422/109 |
| 2012/0192549 A1* | 8/2012 | Sakurai | 60/285 |
| 2012/0216775 A1* | 8/2012 | Iwai et al. | 123/305 |
| 2012/0216776 A1* | 8/2012 | Nagatsu et al. | 123/305 |
| 2012/0240557 A1* | 9/2012 | Kawaguchi et al. | 60/278 |
| 2012/0255285 A1* | 10/2012 | Gonze et al. | 60/286 |
| 2012/0304627 A1* | 12/2012 | Gonze et al. | 60/286 |
| 2012/0324868 A1* | 12/2012 | Kim et al. | 60/274 |
| 2013/0108529 A1* | 5/2013 | Toshioka et al. | 423/212 |
| 2013/0255235 A1 | 10/2013 | Hodgson et al. | |

FOREIGN PATENT DOCUMENTS

| | | |
|---|---|---|
| JP | 2010-084571 A | 4/2010 |
| JP | 2010-116858 A | 5/2010 |
| JP | 2010-265862 A | 11/2010 |

* cited by examiner

ENGINE SYSTEM

CROSS-REFERENCE TO RELATED APPLICATIONS

This application is a national phase application of International Application No. PCT/JP2012/064719, filed Jun. 7, 2012, the content of which is incorporated herein by reference.

TECHNICAL FIELD

The present invention is related to an engine system.

BACKGROUND ART

Patent Documents 1 and 2 disclose a technique related to an SCR catalyst that reduces NOx with a reducing agent of ammonia generated by hydrolyzing urea.

PRIOR ART DOCUMENT

Patent Document

[Patent Document 1] Japanese Patent Application Publication No. 2010-265862
[Patent Document 2] Japanese Patent Application Publication No. 2005-344597

SUMMARY OF THE INVENTION

Problems to be Solved by the Invention

In the technique disclosed in Patent Document 1, a heater controls a temperature of the SCR catalyst to be equal to or higher than a temperature at which urea can be hydrolyzed. Thus, the power consumption of the heater might be increased, so that the fuel consumption might be degraded.

The present invention has an object to provide an engine system enabling an improvement in fuel consumption.

Means for Solving the Problems

To solve the above problem, an engine system includes: an exhaust path through which an exhaust gas of an engine passes; an urea injection valve that injects urea into the exhaust path; a catalyst that is provided in the exhaust path on a downstream of the urea injection valve, and that selectively reduces NOx by using ammonia acting as a reducing agent, the ammonia being generated by hydrolyzing injected urea from the urea injection valve; a heating portion that is capable of heating the catalyst and the injected urea; and a control unit that performs first control, in which the urea injection valve injects urea, the heating portion heats the injected urea to generate ammonia, or second control, in which the heating portion increases a temperature of the catalyst to a temperature at which NOx can be reduced, on a basis of an amount of ammonia adsorbed on the catalyst.

Effects of the Invention

According to the present invention, it is possible to provide an engine system enabling an improvement in fuel consumption.

MODES FOR CARRYING OUT THE INVENTION

Figure 1:
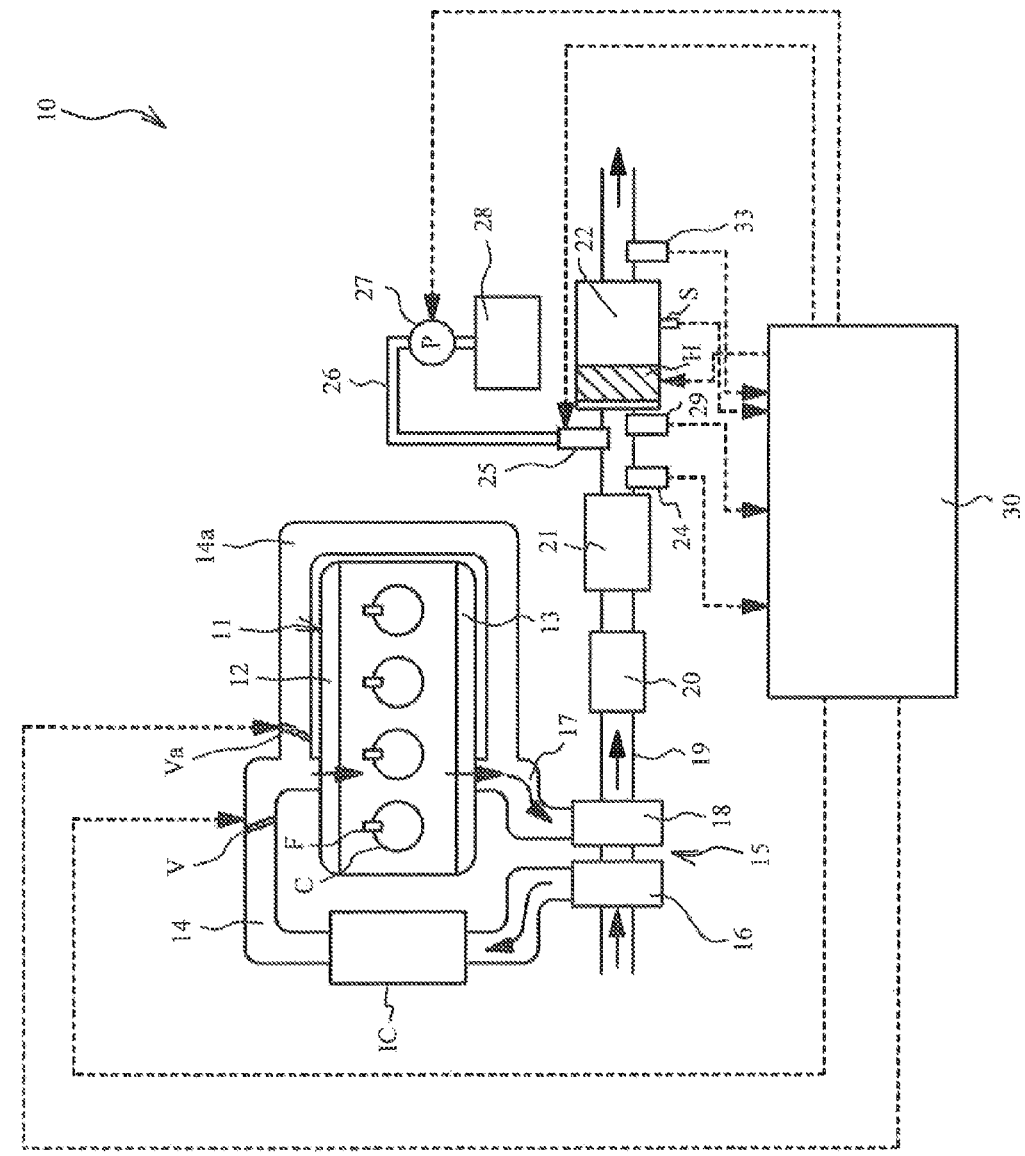
FIG. 1 is an explanatory view of an engine system.

FIG. 1 is a an explanatory view of an engine system 10 according to an embodiment. A diesel engine 11 (hereinafter referred to as engine) is equipped with an intake manifold 12 and an exhaust manifold 13. The intake manifold 12 is connected to an outlet of a compressor 16 of a turbocharger 15 through an intake path 14. The intake path 14 is provided with an intercooler IC for cooling intake air, and a valve V for adjusting the amount of the intake air introduced into the engine 11. The exhaust manifold 13 is connected to an inlet of an exhaust turbine 18 of the turbocharger 15 through an exhaust path 17. The outlet of the exhaust turbine 18 is connected to an exhaust path 19. The exhaust gas is discharged from the engine 11 into the exhaust path 19 through the exhaust turbine 18. The engine 11 is provided with four cylinders C and four fuel injection valves F for directly injecting fuel into the respective cylinders C. An EGR path 14a is connected between the exhaust path 17 and the intake path 14. The EGR path 14a is provided with an FOR valve Va.

The exhaust path 19 is provide with a DOC (oxidation catalyst) 20, a DPF (diesel particulate filter) 21, and a SCR catalyst (selective catalytic reduction) 22, in order from the upstream side to the downstream side. The DOC 20 oxidizes HC and NO contained in the exhaust gas. The DPF 21 traps particulate matters contained in the exhaust gas.

The SCR catalyst 22 reduces NOx contained in the exhaust gas with ammonia as a reducing agent. The SCR catalyst 22 uses, for example, an Fe zeolite of an ammonia adsorption type with a high NOx purification rate at low temperatures. The SCR catalyst 22 is provided with a temperature sensor S for detecting the temperature of the SCR catalyst 22.

An urea injection valve 25 is arranged within the exhaust path 19 between the SCR catalyst 22 and the DPF 21. The urea injection valve 25 is connected to a tank 28 through a supply pipe 26 and a pump 27. Urea water is stored within the tank 28. The urea water is pumped by the pump 27, and is injected from urea injection valve 25 into the exhaust gas flowing in the exhaust path 19. With ammonia generated by hydrolyzing urea, the NOx contained within the exhaust as is selectively reduced in the SCR catalyst 22.

A heater H is provided at a front end portion in the upstream side of the SCR catalyst 22. Specifically, the heater H is an EHC (Electrically Heated Catalyst). The heater H is capable of heating the SCR catalyst 22. Further, as will be described later in detail, the heater H is also capable of heating and hydrolyzing the urea injected from the urea injection valve 25 so as to generate ammonia. The heater H is an example of a heating portion.

A NOx sensor 24 is provided on the upstream side between the DPF 21 and the SCR catalyst 22 in the exhaust path 19, and a temperature sensor 29 is provided on the downstream side therebetween. Moreover, a NOx sensor 33 is provided on the downstream side with respect to the SCR catalyst 22 in the exhaust path 19.

An ECU 30 controls the entire engine system 10. The ECU 30 is a computer composed of a ROM (Read Only Memory) not illustrated, a RAM (Random Access Memory), a CPU (Central Processing Unit), and the like. The ECU 30 is electrically connected to the urea injection valve 25, the pump 27, the heater H, the valve V, and the EGR valve Va. The ECU 30 controls the injection amount of urea injected from urea injection valve 25 into the exhaust path 19, The ECU 30 is an example of a control unit that is capable of performing a first control or a second control that will be described later.

Figure 2A:
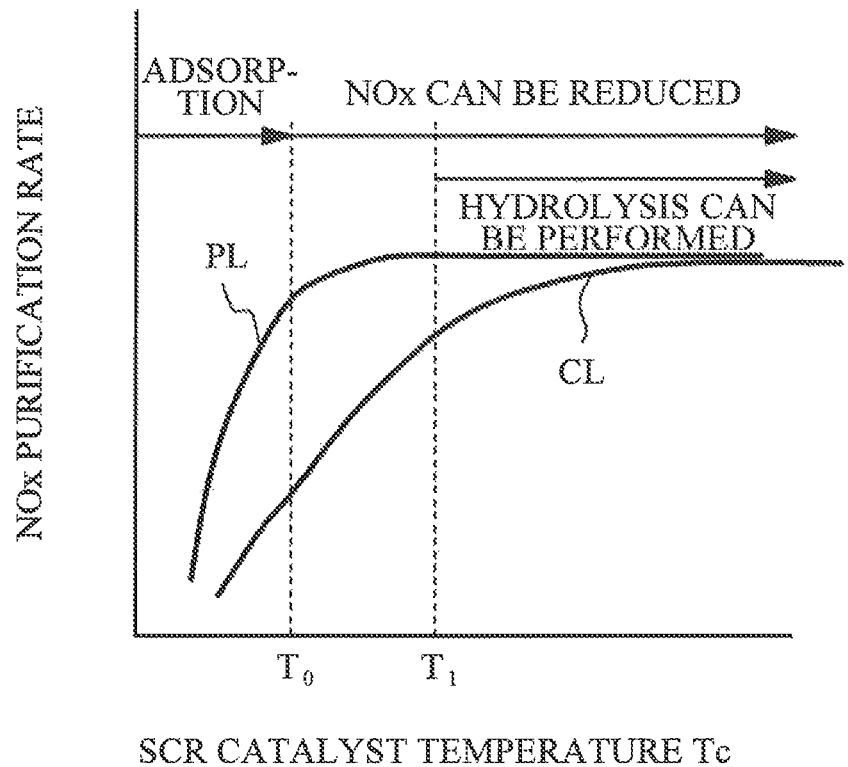
FIGS. 2A and 2B are graphs of characteristics of an SCR catalyst.

FIG. 2A is a graph of the relationship between a NOx purification rate and a temperature of the SCR catalyst 22. A line CL indicates a NOx purification rate of the SCR catalyst 22 in a case where urea water is supplied to the SCR catalyst 22 at each temperature thereof. In a case where the temperature Tc of the SCR catalyst 22 is lower than the temperature $T_0$, the adsorption amount of ammonia adsorbed on the SCR catalyst 22 is relatively large, and the purification rate of NOx is relatively low. In a case where the temperature Tc of the SCR catalyst 22 is equal to or higher than the temperature $T_0$, the SCR catalyst 22 is capable of reducing NOx at the temperature thereof, and the purification rate of NOx is at the middle. In a case where the temperature of the SCR catalyst 22 is the temperature $T_1$ higher than the temperature To, urea is hydrolyzed and ammonia is generated by the SCR catalyst 22, so the NOx purification rate is made high.

Conventionally, after the temperature of the SCR catalyst 22 is increased to be equal to or higher than the temperature $T_1$ by the heater, urea is injected from the urea injection valve 25, and the injected urea is hydrolyzed by the SCR catalyst 22, so that ammonia is generated to reduce NOx.

A line PL in FIG. 2A indicates a purification rate of NOx at each temperature of the SCR catalyst 22 in a state where ammonia is sufficiently adsorbed on the SCR catalyst 22 beforehand. In a case where ammonia has already been sufficiently adsorbed on the SCR catalyst 22, when the temperature Tc of the SCR catalyst 22 is the temperature $T_0$, NOx is reduced with ammonia, so NOx can be sufficiently purified.

Figure 2B:
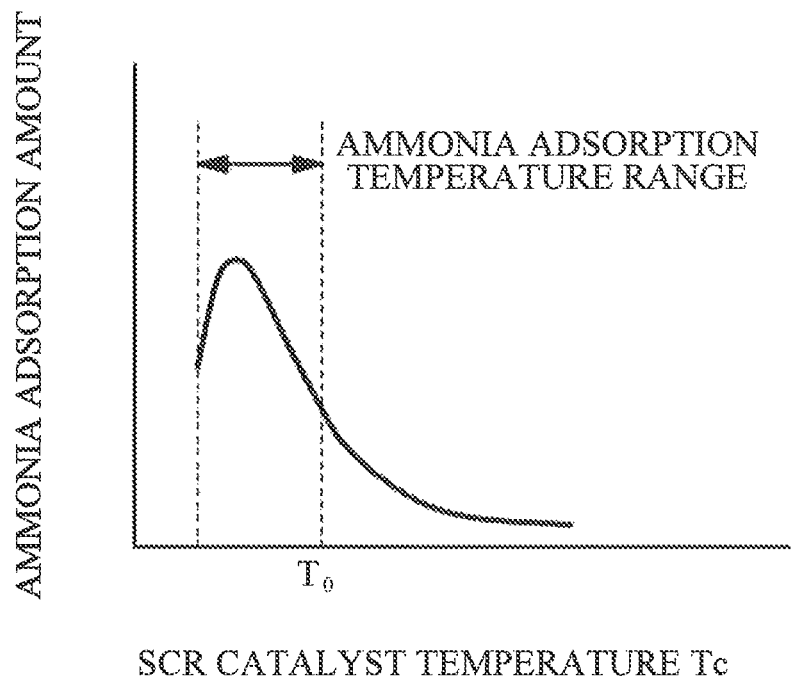

FIG. 2B is a graph of the relationship between the temperature of the SCR catalyst 22 and the adsorption amount of ammonia adsorbed on the SCR catalyst 22. As illustrated in FIG. 2B, when the temperature Tc of the SCR catalyst 22 is lower than the temperature $T_0$, it is seen that the adsorption amount of ammonia is large. In the present embodiment, after ammonia is adsorbed on the SCR catalyst 22, the temperature Tc of the SCR catalyst 22 is increased to the temperature $T_0$, so NOx is purified.

Figure 3:
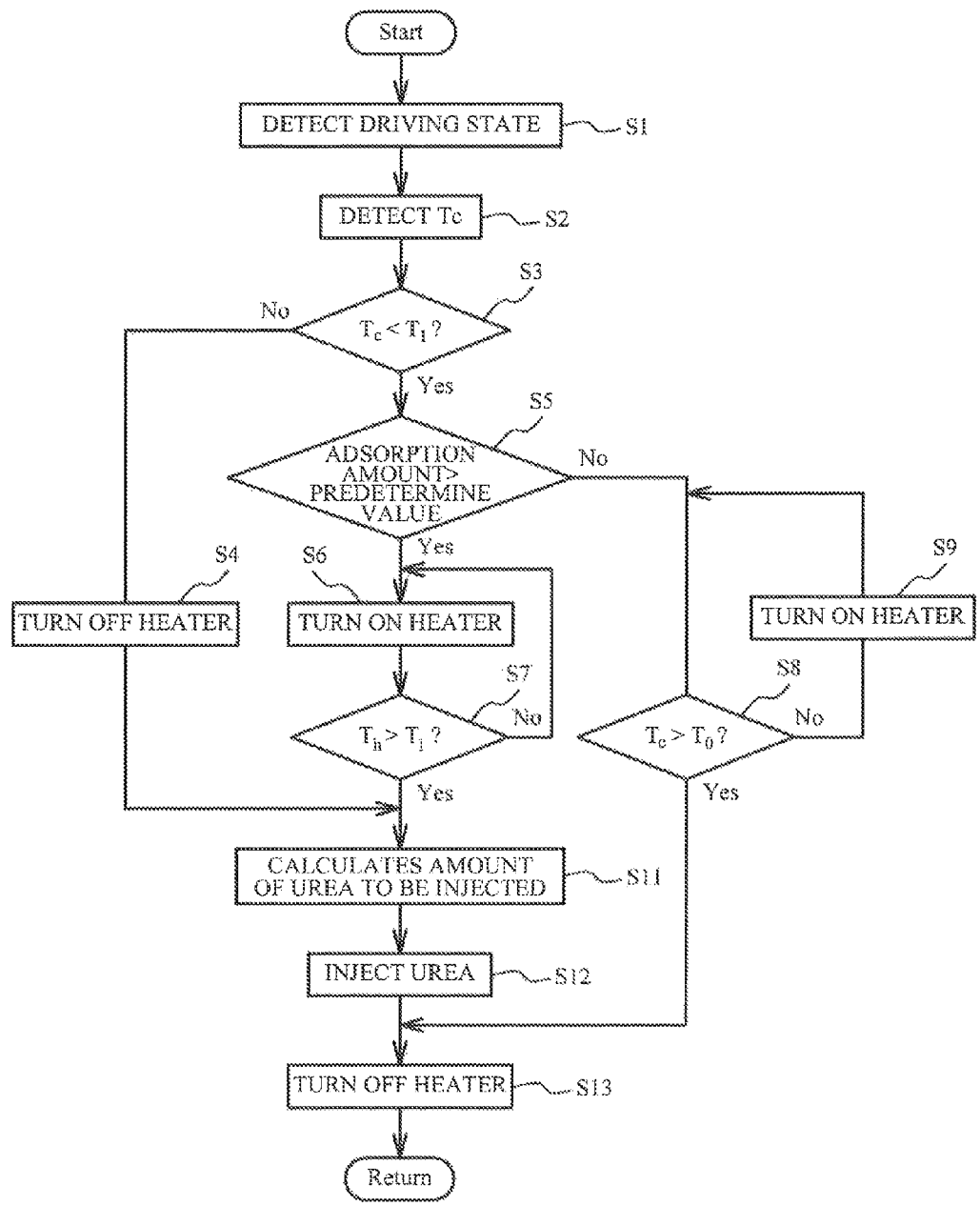
FIG. 3 is a flowchart of an example of control performed by an ECU.

FIG. 3 Is a flowchart of an example of the control performed by the ECU 30. The ECU 30 detects a driving state of the engine 11 (step S1). Specifically, the engine speed, the engine load, and the like are detected based on output values from a crank angle sensor, an air flow meter, and the like.

The ECU 30 detects the temperature Tc of the SCR catalyst 22 based on the output value from the temperature sensor S (step S2). The ECU 30 determines whether or not the temperature Tc of the SCR catalyst 22 is lower than the temperature $T_1$ (step S3). That is, the ECU 30 determines whether or not the temperature Tc of the SCR catalyst 22 is lower than the temperature $T_1$ at which urea water is hydrolyzed and ammonia is generated.

When a negative determination is made, the ECU 30 turns OFF the heater H (step S4), calculates the amount of urea to be injected from the urea injection valve 25 (step S12), and causes urea to be injected (step S12). Thus, ammonia is generated from the urea water injected by the SCR catalyst 22, NOx is reduced. Additionally, after that, the ECU 30 turns OFF the heater H (step S13). However, the heater H has already been turned OFF in step S4. Therefore, in the state where the heater H turns OFF, urea water is injected to reduce NOx.

When the temperature Tc of the SCR catalyst 22 is lower than the temperature $T_1$ in step S3, the ECU 30 determines whether or not the amount of ammonia adsorbed on the SCR catalyst 22 is smaller than a predetermined value (step S5). In addition, the method for calculating the amount of ammonia adsorbed on the SCR catalyst 22 will be described later. When a positive determination is made, that is, when the ammonia adsorption amount is small, the ECU 30 turns ON the heater H (step S6), and determines whether or not the temperature of the heater H is higher than the temperature $T_1$ (step S7). The ECU 30 continues to turn ON the heater H until the temperature of the heater H is higher than the temperature $T_1$. That is, the ECU 30 continues to turn ON the heater H until the temperature of the heater H reaches the temperature at which urea water is hydrolyzed and ammonia is generated. When the temperature of the heater H is higher than the temperature $T_1$, the ECU 30 calculates the amount of urea to he injected from the urea injection valve 25 (step S11), and controls the urea injection valve 25 to inject urea (step S12). After that, the ECU 30 turns OFF the heater H (step S13).

Figure 4:
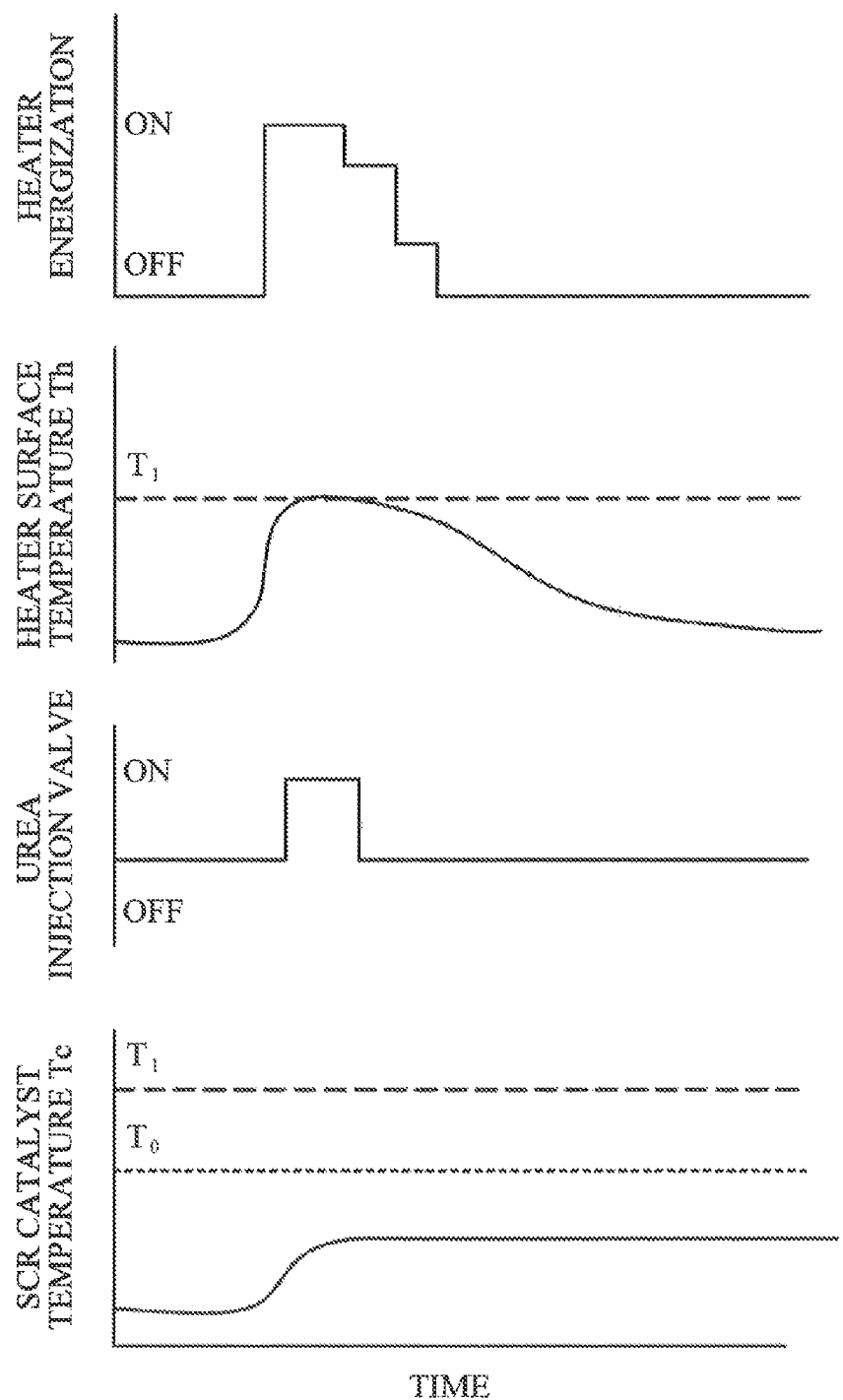
FIG. 4 is a timing chart.

FIG. 4 is a timing chart illustrating the relationship among the energization state of the heater H, a surface temperature of the heater H, the control state of the urea injection valve 25, and the temperature of the SCR catalyst 22. FIG. 4 is a timing chart of the control performed by the ECU 30 in a case where the amount of ammonia adsorbed on the SCR catalyst 22 is small. The timing chart in FIG. 4 corresponds to the processes in steps S5 to S7 and S11 to S13. These processes are an example of the first control.

As illustrated in FIG. 4, the energization of the heater H is controlled such that the surface temperature Th of the heater H is maintained to the temperature $T_1$ at which urea can be hydrolyzed for a predetermined period (step S6). Urea is injected from the urea injection valve 25 before and after the surface temperature Th of the heater H reaches the temperature $T_1$. Urea is hydrolyzed by receiving heat from the heater H and ammonia is generated. This ammonia is adsorbed on the SCR catalyst 22. Herein, although the SCR catalyst 22 is heated by receiving heat from the heater H, the heater H is turned OFF before the temperature Tc of the SCR catalyst 22 is higher than the temperature $T_0$. Since the temperature Tc of the SCR catalyst 22 is not higher than the temperature $T_0$, ammonia is sufficiently adsorbed on the SCR catalyst 22, as illustrated in FIG. 2B.

Referring back to FIG. 3, the ECU 30 performs the processes in steps S1 to S3 again. When a positive determination is made in step S3, it is determined that the amount of ammonia adsorbed on the SCR catalyst 22 is larger than a predetermined value in step S5. When ammonia has already been sufficiently adsorbed on the SCR catalyst 22 by the processes in steps S5 to S7 and S11 to S13, the ECU 30 determines whether or not the temperature Tc of the SCR catalyst 22 is higher than the temperature $T_0$ (step S8). The ECU 30 continues to turn ON the heater H until the temperature Tc of the SCR catalyst 22 is higher than the temperature $T_0$. When the temperature Tc of the SCR catalyst 22 is higher than the temperature $T_0$, the ECU 30 turns OFF the heater H (step S13).

Figure 5:
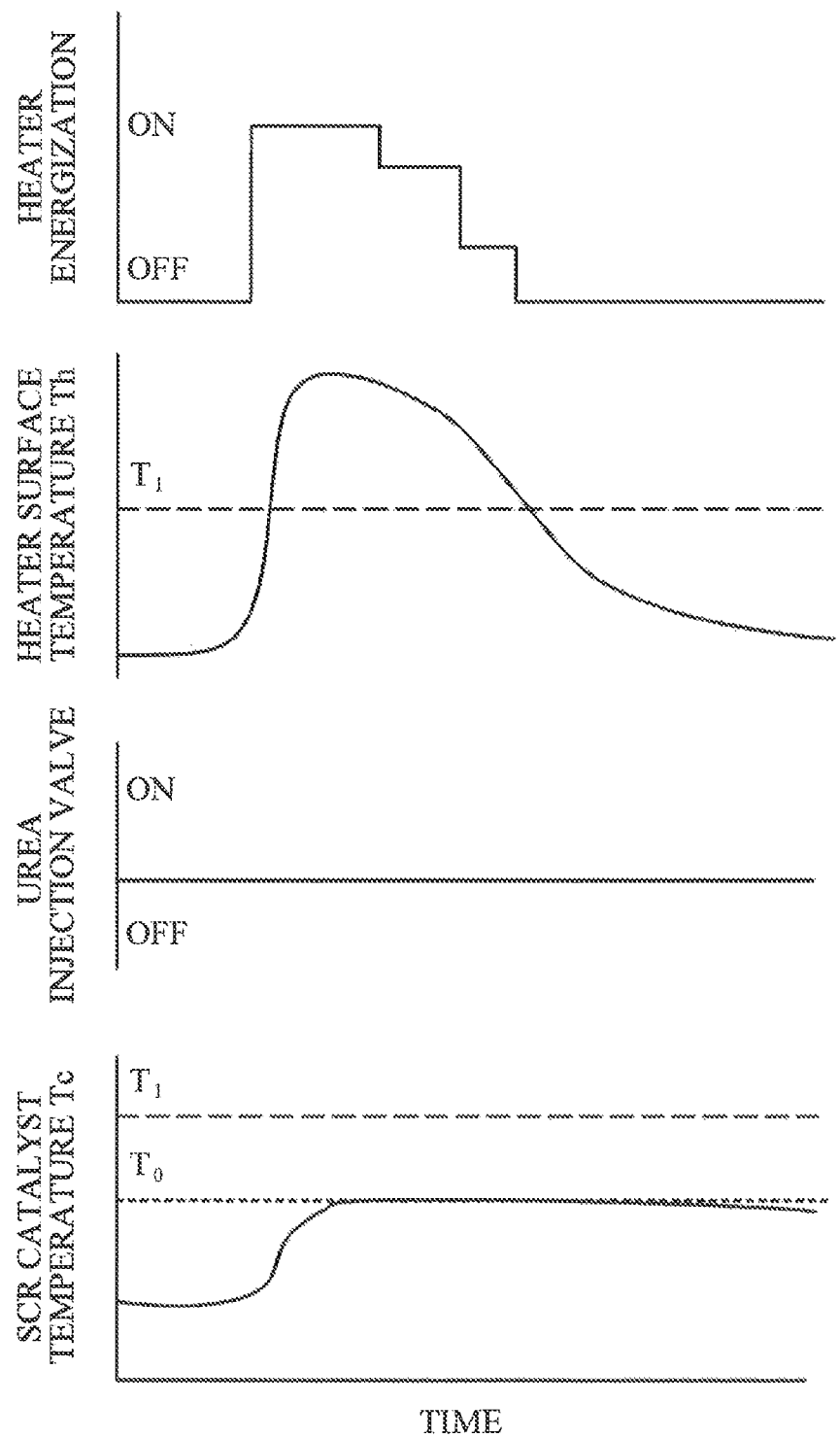
FIG. 5 is a timing chart.

The timing chart in FIG. 5 corresponds to the processes in steps S8, S9, and S13. These processes are an example of the second control. As illustrated in FIG. 5, the energization of the heater H is controlled such that the temperature Tc of the SCR catalyst 22 is kept to the temperature $T_0$ for a predetermined period (step S9). As illustrated in FIG. 4, the surface temperature Th of the heater H is higher than the temperature $T_1$. That is, the energization control of the heater H in step S6 is different from the energization control of the heater H in the step S9. Electric power used in the heater H in step S9 is greater than that in the heater H in step S6. Specifically, the energization period of the heaters H in step S9 is longer than that of the heater H in step S6.

In the above mentioned first control, ammonia has already been adsorbed on the SCR catalyst 22. Therefore, in the second control, the temperature Tc of the SCR catalyst 22 is increased to the temperature $T_0$ at which NOx can be reduced, so NOx is reduced in the exhaust gas. Thus, the surface temperature Th of the heater H is an object to be controlled in the first control, and the temperature Tc of the SCR catalyst 22 is an object to be controlled in the second control. On the basis of the amount of ammonia adsorbed on the SCR catalyst 22, the ECU 30 performs the first control or the second control.

Conventionally, regardless of the amount of ammonia adsorbed on the SCR catalyst 22, the heater H always increases the temperature Tc of the SCR catalyst 22 to the temperature $T_1$ at which urea is hydrolyzed, so that the power consumption is increased. As a result, the amount of electric power generated by an alternator is increased. The alternator generates power by converting a part of the power of the engine 11 into the electrical energy. Therefore, when the load on the engine 11 is increased, the amount of power generated by the alternator is increased. This degrades the fuel consumption. In the present embodiment, the heater H increases the temperature Tc of the SCR catalyst 22 to the temperature $T_0$ lower than the temperature $T_1$, thereby reducing NOx. Therefore, the power consumption of the heater H is suppressed, so the fuel consumption is improved.

Figure 6:
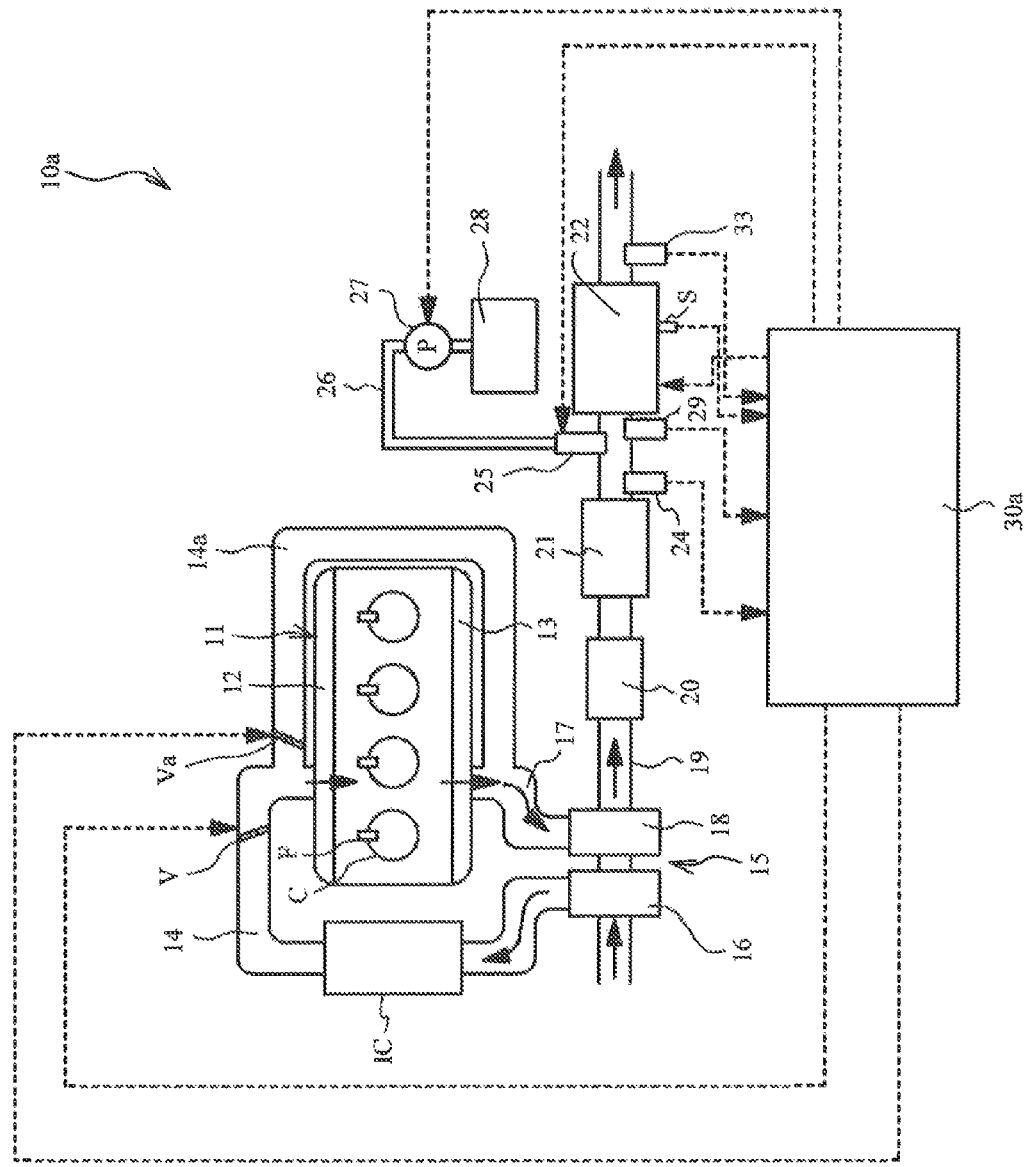
FIG. 6 is an explanatory view of an engine system according to a first variation.
Figure 7:
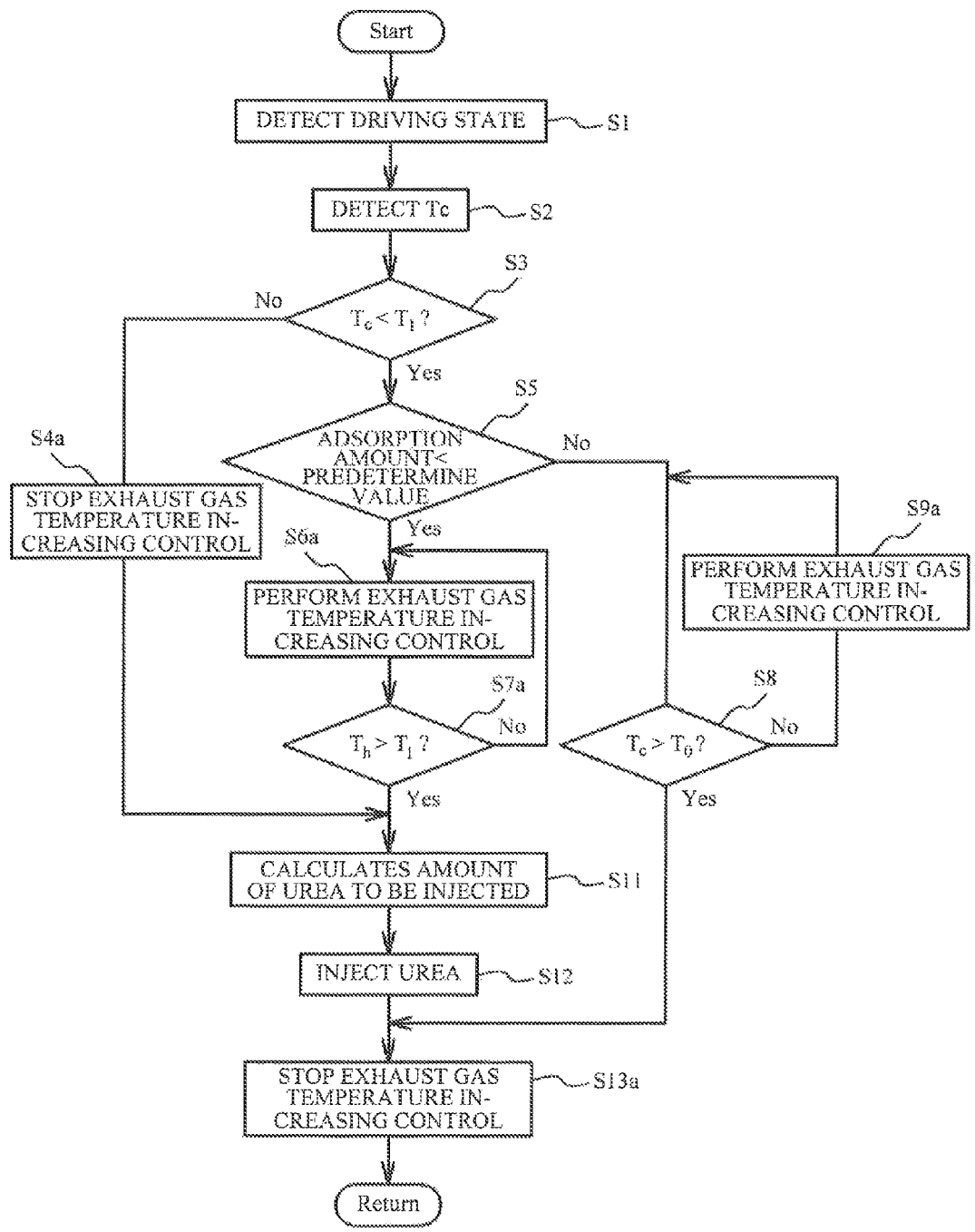
FIG. 7 is a flowchart of an example of control performed by an ECU.

Next, a description will be given of the method for reducing NOx in which urea is adsorbed on the SCR catalyst 22 by increasing the temperature of the exhaust gas without using the heater. FIG. 6 is an explanatory view of an engine system 10a according to the first variation. In addition, the same components of the engine system 10 are denoted by the same reference numerals, and a detailed description of such components will be omitted. Unlike the engine system 10, the engine system 10a is not provided with the heater H. FIG. 7 is a flowchart of an example of the control performed by an ECU 30a.

As illustrated in FIG. 7, instead of controlling the energization of the heater H, the ECU 30a performs the exhaust gas temperature increasing control (steps S4a, S6a, S9a, and S13a). Further, in a case where ammonia is not adsorbed on the SCR catalyst 22, the exhaust gas temperature increasing control is performed until a temperature Tg of the exhaust gas is increased to a temperature $T_1$ at which urea is hydrolyzed (steps S6a and S7a). The temperature Tg of the exhaust gas is detected based on the output value from the temperature sensor 29.

In the first variation, the ECU 30a controls the fuel injection valve F to perform the post injection or the after injection for a predetermined period so as to perform the exhaust gas temperature increasing control. As a result, the temperature of the exhaust gas is increased. The post injection and the after injection are the sub injection that is performed after the main injection. The fuel injection valve F is an example of a heating portion that increases the temperature of the exhaust gas.

The exhaust gas temperature increasing control is performed in step S6, so that urea is heated and hydrolyzed by the exhaust gas, which generates ammonia, thereby enabling the generated urea to be adsorbed on the SCR catalyst 22. In particular, the temperature of the exhaust gas is controlled such that the exhaust gas hydrolyzes urea and that the temperature Tc of the SCR catalyst 22 is lower than the temperature $T_0$.

Further, in step S9a, the temperature of the exhaust gas is controlled such that the temperature Tc of the SCR catalyst 22 is maintained to the temperature $T_0$ for a predetermined period. Herein, the fuel injection amount consumed in the exhaust gas temperature increasing control in step S9a is larger than that in the exhaust gas temperature increasing control in step S6a. For example, the period while the post injection or the after injection is performed in step S9a is longer than the period while the post injection or the after injection is performed in step S6a.

Therefore, as compared with the case where the temperature Tc of the SCR catalyst 22 is always increased to the temperature $T_1$ by performing the post injection or the after injection, the fuel consumption amount used for the post injection or the after injection is suppressed in the first variation. This can prevent the fuel consumption from deteriorating.

Also, in the first variation, the amount of intake air may be reduced in conjunction with the performance of the after injection or the post injection. Specifically, the ECU 30a controls the opening degree of the intake valve V in the exhaust gas temperature increasing control, thereby reducing the amount of intake air.

In the first variation, the retard control of the fuel injection timing in the fuel injection valve F may be performed without performing the after injection or the post injection, thereby performing the exhaust gas temperature increasing control. The retard control of the fuel injection is performed, so that the output of the engine 11 is made lower and the fuel consumption is degraded. However, the temperature of the exhaust gas is increased. Thus, as compared with the case where the temperature Tc of the SCR catalyst 22 is increased to the temperature $T_1$ by performing the retard control of the fuel injection, the fuel consumption is prevented from deteriorating, in the case where ammonia is adsorbed on the SCR catalyst 22 beforehand and then the temperature Tc of the SCR catalyst 22 is increased to the temperature $T_1$.

Figure 8:
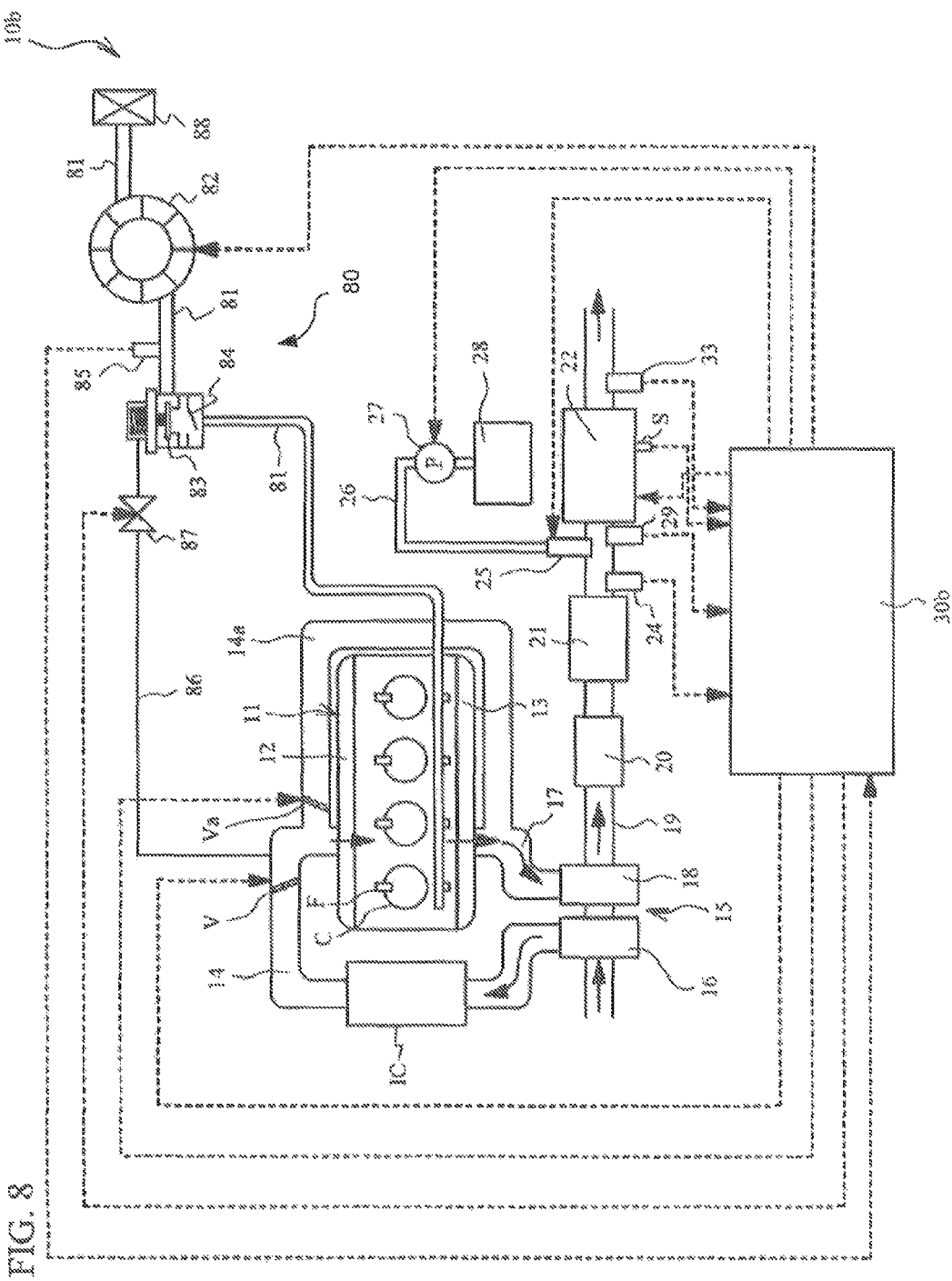
FIG. 8 is an explanatory view of an engine system according to a second variation.

FIG. 8 is an explanatory view of an engine system 10b according to the second variation. Additionally, the control performed by an ECU 30b will be described with reference to FIG. 7. The engine system 10b is provided with a secondary air supply device 80. The secondary air supply device 80 supplies air taken from the outside to the exhaust port of each cylinder C in the engine 11. A supply path 81 is provided with an air pump 82, an air switching valve 83, and a reed valve 84 of a check valve, in order from the upstream side. A pressure sensor 85 is provided between the air pump 82 and the air switching valve 83. The air switching valve 83 is connected to a negative pressure path 86 extending toward the downstream side with respect to the throttle valve V in the intake path 14. The negative pressure path 86 is provided with a solenoid valve 87. The downstream side of the supply path 81 is connected to the exhaust port of each cylinder C.

The air pump 82 is provided at its air inlet with an air cleaner 88. When the solenoid valve 87 is opened, the negative pressure within the negative pressure path 86 is introduced to the air switching valve 83, so the air switching valve 83 is opened. Next, the air pumped from the air pump 82 flows into the exhaust port of each cylinder C through the supply path 81. Thus, the oxygen concentration in the exhaust gas is increased, thereby promoting combustion of HC and CO in the exhaust gas. As a result, the temperature of the exhaust gas is increased. This exhaust gas having the high temperature can also heat the SCR catalyst 22 and the injected urea. The secondary air supply device 80 is an example of a heating portion that increases the temperature of the exhaust gas.

In order to increase the temperature of the exhaust gas by use of the secondary air supply device 80, the air pump 82 has to be driven. In a case where the power consumption of the air pump 82 is high, the fuel consumption is degraded, like the case where the power consumption of the heater H is high.

As for the second variation, in Steps S6a and S9a, the secondary air supply device 80 supplies air to the exhaust gas, thereby increasing the temperature of the exhaust gas. Thus, in step S6a, the exhaust gas can hydrolyze urea to generate ammonia. In step S9a, the temperature Tc of the SCR catalyst 22 can be increased to the temperature $T_0$. Additionally, the supply period of air supplied to the exhaust gas in step S9a is longer than that of the air supplied to the exhaust gas in step S6a.

As compared with the case where the temperature Tc of the SCR catalyst 22 is always increased to the temperature $T_1$ by the secondary air supply device 80, the power consumption amount of the air pump 82 of the secondary air supply device 80 is suppressed in the second variation. It is thus possible to prevent the fuel consumption from deteriorating.

Figure 9:
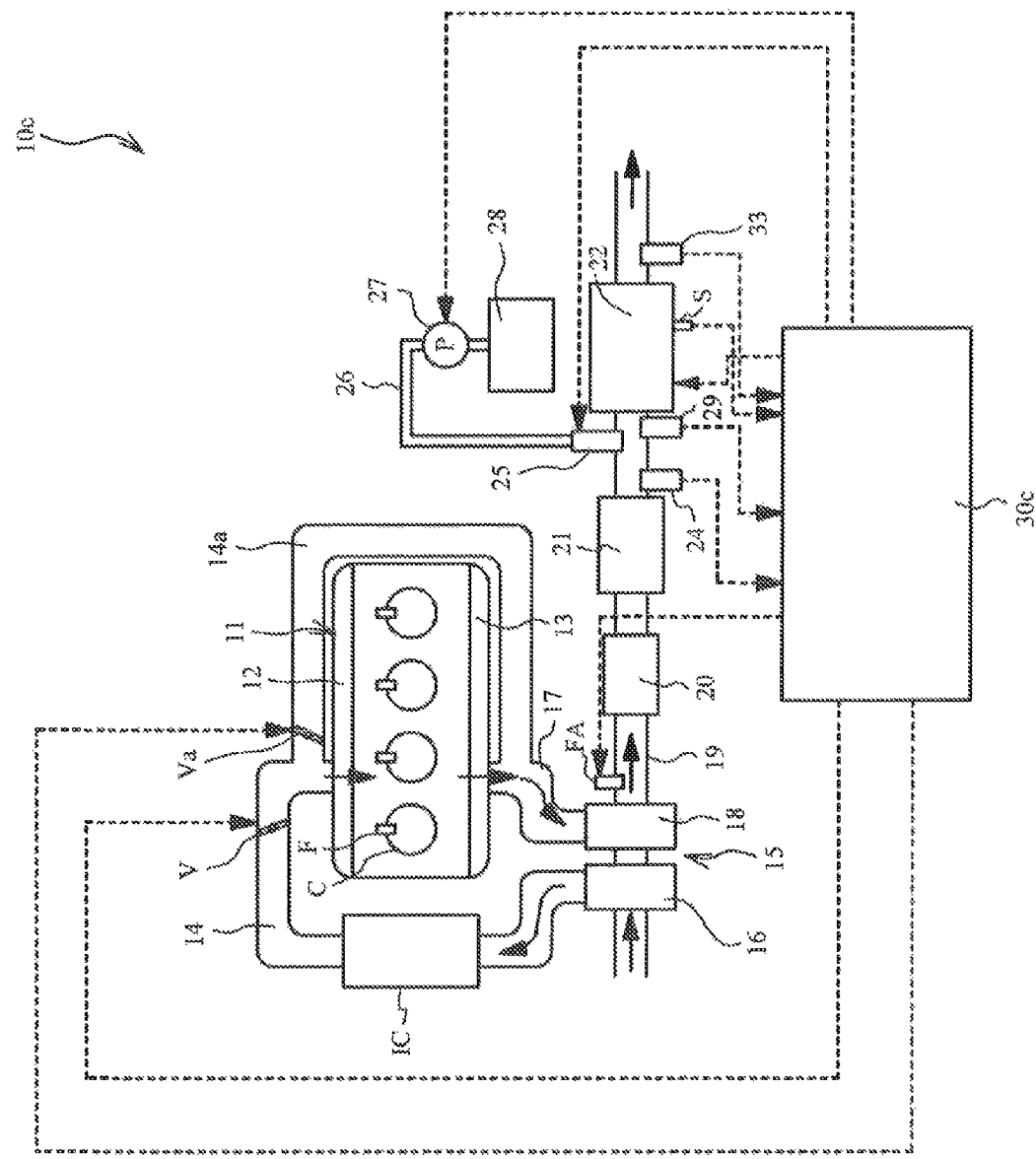
FIG. 9 is an explanatory view of an engine system according to a third variation.

FIG. 9 is an explanatory view of an engine system 10c according to the third variation. Additionally, the control performed by an ECU 30c will be described with reference to FIG. 7. A fuel injection valve FA is provided between the exhaust turbine 18 and the DOC 20 in the exhaust path 19. The fuel. injection valve FA is connected to a fuel tank via a pump. The ECU 30c controls the fuel injection valve FA to inject fuel to the exhaust gas, thereby performing the exhaust gas temperature increasing control. In step S6a, the exhaust gas can hydrolyze urea to generate ammonia. In step S9a, the temperature Tc of the SCR catalyst 22 can be increased to the temperature $T_0$. The fuel injection amount of the fuel injection valve FA in step S9a is larger than that of the fuel injection valve FA in step S6a.

As compared with the case where the temperature Tc of the SCR catalyst 22 is always increased to the temperature $T_1$ by the fuel injection valve FA, the fuel consumption amount is suppressed in the third variation. It is thus possible to prevent the fuel consumption from deteriorating. Also, the position where the fuel injection valve FA is arranged has only to be a position on the upstream side with respect to the urea injection valve 25 in the exhaust path 19. The fuel injection valve FA is an example of a heating portion that increases the temperature of the exhaust gas. Also, a burner may be arranged in the exhaust path 19, instead of the fuel injection valve FA.

Figure 10:
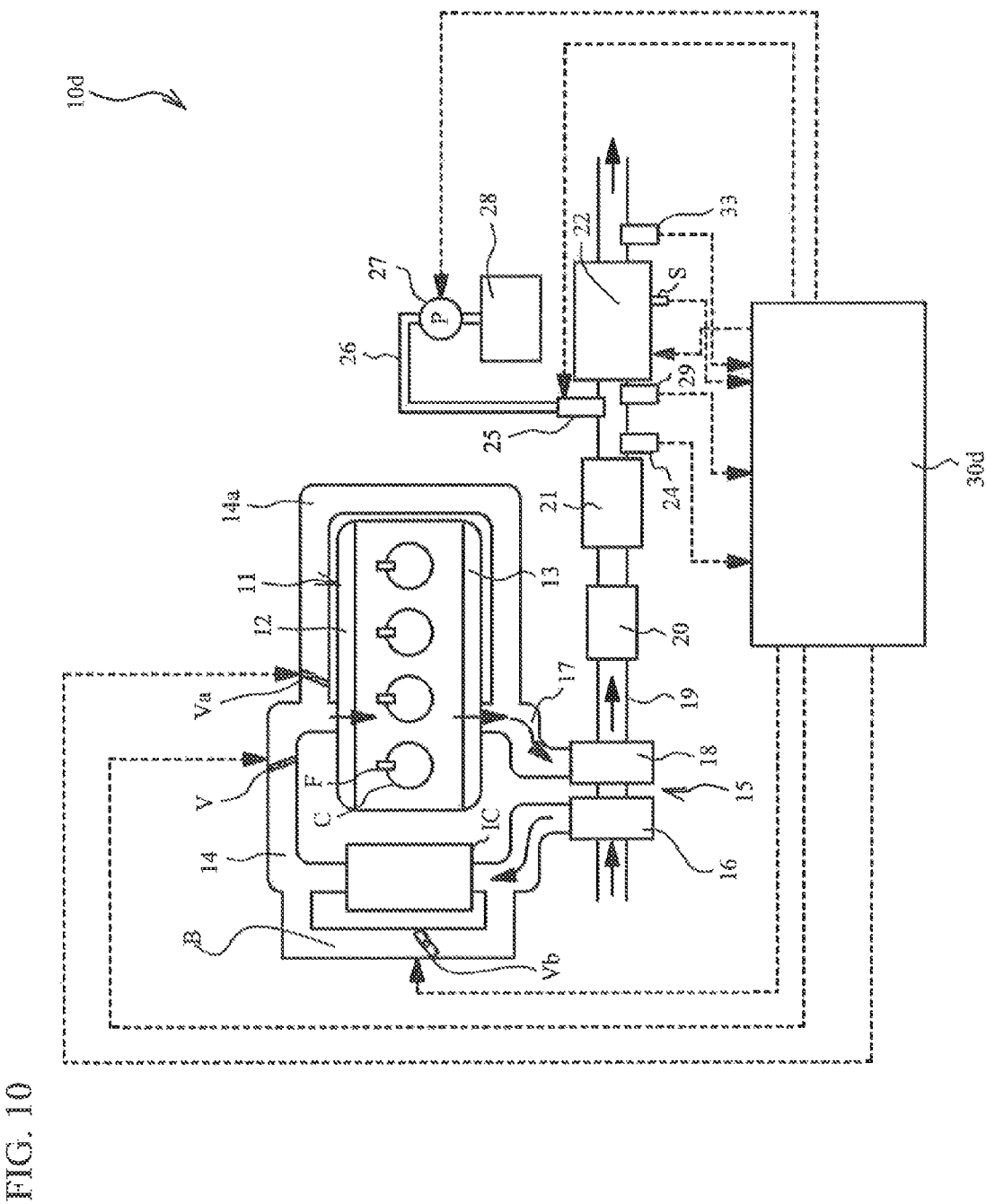
FIG. 10 is an explanatory view of an engine system according to a fourth variation.

FIG. 10 is an explanatory view of an engine system 10d according to the fourth variation. Additionally, the control performed by an ECU 30d will be described with reference to FIG. 7. The engine system 10d is provided with a bypass path B that bypasses the intercooler IC. The bypass path B is provided with an opening and closing valve Vb controlled by the ECU 30d. In the exhaust gas temperature increasing control, the opening and closing valve Vb is controlled such that intake air bypasses the intercooler IC and is introduced into the engine 11. This suppresses the temperature of the intake air from decreasing, so the temperature of the exhaust gas is increased. In addition, when the temperature of the intake air is suppressed from decreasing, the volume of the intake air introduced to the engine 11 is decreased, so that the output of the engine 11 is reduced. As a result, the fuel consumption deteriorates.

Additionally, the period while the intake air bypasses the intercooler IC in step S9a is longer than the period while the intake air bypasses the intercooler IC in step S6a.

As compared with the case where the temperature Tc of the SCR catalyst 22 is always increased to the temperature $T_1$ by causing the intake air to bypass the intercooler IC, the output of the engine 11 is less reduced in the fourth variation. It is thus possible to prevent the fuel consumption from deteriorating. The bypass path B and the opening and closing valve Vb are an example of a heating portion that increases the temperature of the exhaust gas. The intercooler IC is an example of a cooling portion that cools intake air.

In the fourth variation, the temperature of the exhaust gas is increased by bypassing the intercooler IC, but this configuration is not limited. For example, the exhaust gas temperature increasing control may be performed such that the exhaust gas bypasses an EGR cooler provided in the EGR path and that the exhaust gas returns to the engine 11. Also, the exhaust gas temperature increasing control may be performed such that the exhaust gas bypasses the exhaust turbine 18. The exhaust gas bypasses the exhaust turbine 18, so that the output of the engine 11 is reduced and the fuel consumption is degraded, but the decrease in the temperature of the exhaust gas is suppressed. In this case, the bypass path and an opening and closing valve are an example of a heating portion that increases the temperature of the exhaust gas.

Next, a description will be given of the calculation method, performed in the above control, for calculating the amount of ammonia adsorbed on the SCR catalyst 22. Firstly, on the basis of the fuel injection amount and the engine rotation number, the concentration of NOx in the exhaust gas flow is estimated. Then, on the basis of the estimated concentration of NOx and the intake air amount, the amount of NOx within the exhaust gas that flows toward the SCR catalyst 22 is estimated. Next, on the basis of the output value of the NOx sensor 33 and the intake air amount, the amount of NOx within the exhaust gas that has flowed through the SCR catalyst 22. Thus, it is possible to calculate the change amount of the NOx in the exhaust gas before and after the exhaust gas passes through the SCR catalyst 22. The calculated change amount of NOx is identical to the amount of NOx reduced by the SCR catalyst 22. The amount of NOx reduced by the SCR catalyst 22 is corrected by the temperature of the SCR catalyst 22. Thus, the corrected value is calculated as the amount of ammonia adsorbed on the SCR catalyst 22. In such a way, the amount of ammonia adsorbed on the SCR catalyst 22 is calculated. Additionally, the amount of NOx reduced by the SCR catalyst 22 may be calculated based on the difference between the output values of the NOx sensors 24 and 33 respectively arranged on the upstream and downstream sides with respect to the SCR catalyst 22.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiment of the present inventions has been described in detail, it should he understood that the various changes, substitutions, and alterations could be made hereto without departing from the spirit and scope of the invention.

The present invention is also applicable to an engine system with a gasoline engine.

DESCRIPTION OF LETTERS OR NUMERALS

10 engine system
11 engine
22 SCR catalyst
25 urea injection valve
30 ECU
80 secondary air supply device
F, FA fuel injection valve
H heater S temperature sensor
IC intercooler
B bypass path
Vb opening and closing valve

The invention claimed is:

1. An engine system comprising:
   an exhaust path through which an exhaust gas from an engine passes;
   a urea injection valve that injects urea into the exhaust path;
   a catalyst that is provided in the exhaust path downstream of the urea injection valve, and that selectively reduces NOx by using ammonia acting as a reducing agent, the ammonia being generated by hydrolyzing injected urea from the urea injection valve;
   a heating portion that is capable of heating the catalyst and the injected urea; and
   a controller programmed to perform a first control and a second control, wherein in the first control, the urea injection valve injects urea, and the heating portion heats the injected urea to a first temperature at which ammonia is generated from the injected urea,
   wherein in the second control, the heating portion increases a temperature of the catalyst to a second temperature that is lower than the first temperature at which NOx can be reduced, and
   wherein the first control is performed based on an amount of ammonia adsorbed on the catalyst being smaller than a predetermined value, and the second control is performed based on the amount of ammonia adsorbed on the catalyst being equal to or larger than the predetermined value.

2. The engine system of claim 1, wherein the heating portion is a heater.

3. The engine system of claim 1, wherein the heating portion is a fuel injection valve that increases a temperature of the exhaust gas to heat the catalyst and the injected urea by performing at least one of after injection and post infection.

4. The engine system of claim 1, wherein the heating portion is a secondary air supply device that supplies oxygen to the exhaust gas to increase a temperature of the exhaust gas.

5. The engine system of claim 1, wherein the heating portion is a fuel addition valve that adds fuel to the exhaust gas to increase a temperature of the exhaust gas.

6. The engine system of claim 1, wherein the heating portion is a bypass path that causes intake air to bypass a cooling portion cooling a temperature of intake air to be introduced into the engine to increase a temperature of the exhaust gas.

7. The engine system of claim 1, wherein the heating portion is a fuel injection valve, which is controlled to retard an injection timing of injecting fuel to the engine to increase a temperature of the exhaust gas.

* * * * *